(12) United States Patent
Briese et al.

(10) Patent No.: US 8,001,742 B2
(45) Date of Patent: Aug. 23, 2011

(54) MUNTIN BAR CLIP AND MUNTIN BAR ASSEMBLY

(75) Inventors: William A. Briese, Hinckley, OH (US); John Grismer, Cuyahoga Falls, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 783 days.

(21) Appl. No.: 11/505,042

(22) Filed: Aug. 16, 2006

(65) Prior Publication Data

US 2008/0040995 A1 Feb. 21, 2008

(51) Int. Cl.
| | |
|---|---|
| *E06B 3/964* | (2006.01) |
| *E06B 3/70* | (2006.01) |
| *E04C 2/38* | (2006.01) |
| *E04C 2/42* | (2006.01) |
| *F16B 9/00* | (2006.01) |

(52) U.S. Cl. ........ 52/656.8; 52/204.61; 52/456; 52/665; 403/201; 403/230

(58) Field of Classification Search ............... 52/204.61, 52/456, 665, 656.8, 656.9, 655.1; 403/201, 403/230, 238, 239
See application file for complete search history.

(56) References Cited

U.S. PATENT DOCUMENTS

| | | | | |
|---|---|---|---|---|
| 2,173,664 | A | | 9/1939 | Shultts |
| 2,353,579 | A | * | 7/1944 | Miller ............................ 411/447 |
| 3,882,755 | A | * | 5/1975 | Enstrom ....................... 411/456 |

(Continued)

FOREIGN PATENT DOCUMENTS

DE 2637034 8/1976

(Continued)

OTHER PUBLICATIONS

Contoured Muntin Bar External Intersect, Copyright 1996-1998 Allmetal, Inc. (3 pages).

(Continued)

*Primary Examiner* — Basil Katcheves
*Assistant Examiner* — Ryan D Kwiecinski
(74) *Attorney, Agent, or Firm* — Tarolli, Sundheim, Covell & Tummino LLP

(57) ABSTRACT

Method and apparatus for making a contoured muntin bar assembly or grid. A tubular muntin bar grid has a first muntin bar formed from an elongated tube having ends that engage a window spacer frame and include side walls that have relatively narrow top and bottom planar walls and relatively wider side planar walls. The top and bottom planar walls defining one or more slots that define intersecting muntin bar positions. One or more intersecting muntin bars formed from elongated tubes have ends that engages the first elongated muntin bar in a region of a slot. The grid includes one or more joiner clips for positioning the one or more intersecting muntin bars in relation to said first muntin bar. Each joiner clip has a tree portion that extends into one end of said intersecting muntin bars to support the intersecting muntin bars in relation to the first muntin bar and an anchor portion which extends into a slot of said first muntin bar and connects to a wall of the first muntin bar spaced from a wall of the first muntin bar contacted by an associated intersecting muntin bar which engages the tree portion of the joiner clip. The anchor portion includes either an integral tab which traps the wall of the muntin bar between a flexible finger or a separate tab which is mounted to a clip base that defines the flexible finger.

5 Claims, 5 Drawing Sheets

U.S. PATENT DOCUMENTS

| | | | |
|---|---|---|---|
| 4,105,348 A * | 8/1978 | Anderson et al. | 403/172 |
| 4,513,546 A | 4/1985 | Gow | |
| 4,628,582 A | 12/1986 | Leopold | |
| 4,683,634 A | 8/1987 | Cole | |
| 4,783,938 A | 11/1988 | Palmer | |
| 4,970,840 A * | 11/1990 | Ouellette et al. | 52/204.61 |
| 4,989,384 A | 2/1991 | Kinghorn et al. | |
| 5,048,997 A | 9/1991 | Peterson | |
| 5,099,626 A * | 3/1992 | Seeger | 52/314 |
| 5,177,920 A * | 1/1993 | Rafeld | 52/314 |
| 5,313,761 A | 5/1994 | Leopold | |
| D350,064 S * | 8/1994 | Crawley | D8/382 |
| 5,657,590 A * | 8/1997 | Digman et al. | 52/204.61 |
| 5,678,376 A * | 10/1997 | Poma | 52/656.8 |
| 5,678,377 A * | 10/1997 | Leopold | 52/656.9 |
| 5,791,102 A * | 8/1998 | Sheath et al. | 52/204.7 |
| 5,899,033 A * | 5/1999 | Merchlewitz | 52/204.61 |
| 6,173,484 B1 | 1/2001 | McGlinchy et al. | |
| 6,178,094 B1 * | 1/2001 | Hakozaki | 361/796 |
| D441,875 S * | 5/2001 | Wylie | D25/61 |
| 6,244,012 B1 * | 6/2001 | McGlinchy et al. | 52/665 |
| 6,301,843 B1 * | 10/2001 | Silverman | 52/204.5 |
| 6,347,902 B1 * | 2/2002 | Loh | 403/298 |
| 6,425,221 B1 * | 7/2002 | Reichert | 52/456 |
| 6,484,360 B1 * | 11/2002 | DeBartolo et al. | 16/95 R |
| 6,651,304 B2 | 11/2003 | McGlinchy et al. | |
| 6,739,101 B2 * | 5/2004 | Trpkovski | 52/206 |
| 6,862,859 B2 * | 3/2005 | Kronenberg | 52/656.9 |
| 6,883,278 B2 * | 4/2005 | McGlinchy et al. | 52/204.61 |
| 6,898,914 B2 * | 5/2005 | Folsom et al. | 52/656.8 |
| 6,935,078 B1 * | 8/2005 | Benkel | 52/204.69 |
| 7,104,021 B2 * | 9/2006 | Apfelthaler | 52/656.9 |
| 7,124,546 B2 * | 10/2006 | Scharff et al. | 52/314 |
| 7,533,507 B2 * | 5/2009 | Hornung et al. | 52/456 |
| 2002/0048486 A1 * | 4/2002 | Apfelthaler | 403/187 |
| 2005/0086880 A1 * | 4/2005 | Polowinczak | 52/204.62 |
| 2005/0102957 A1 * | 5/2005 | Scharff et al. | |
| 2005/0235586 A1 * | 10/2005 | Hornung et al. | 52/204.61 |
| 2006/0112654 A1 * | 6/2006 | Reichert | 52/202 |
| 2006/0185294 A1 * | 8/2006 | Langer et al. | 52/456 |
| 2006/0196142 A1 * | 9/2006 | Liang | 52/712 |
| 2007/0193148 A1 * | 8/2007 | Simko et al. | 52/300 |
| 2008/0066411 A1 * | 3/2008 | Tyler | 52/456 |

FOREIGN PATENT DOCUMENTS

| | | |
|---|---|---|
| DE | 8805653 | 4/1988 |

OTHER PUBLICATIONS

Bay Form Solutions for the Window Industry, Copyright 1995 (13 pages).

* cited by examiner

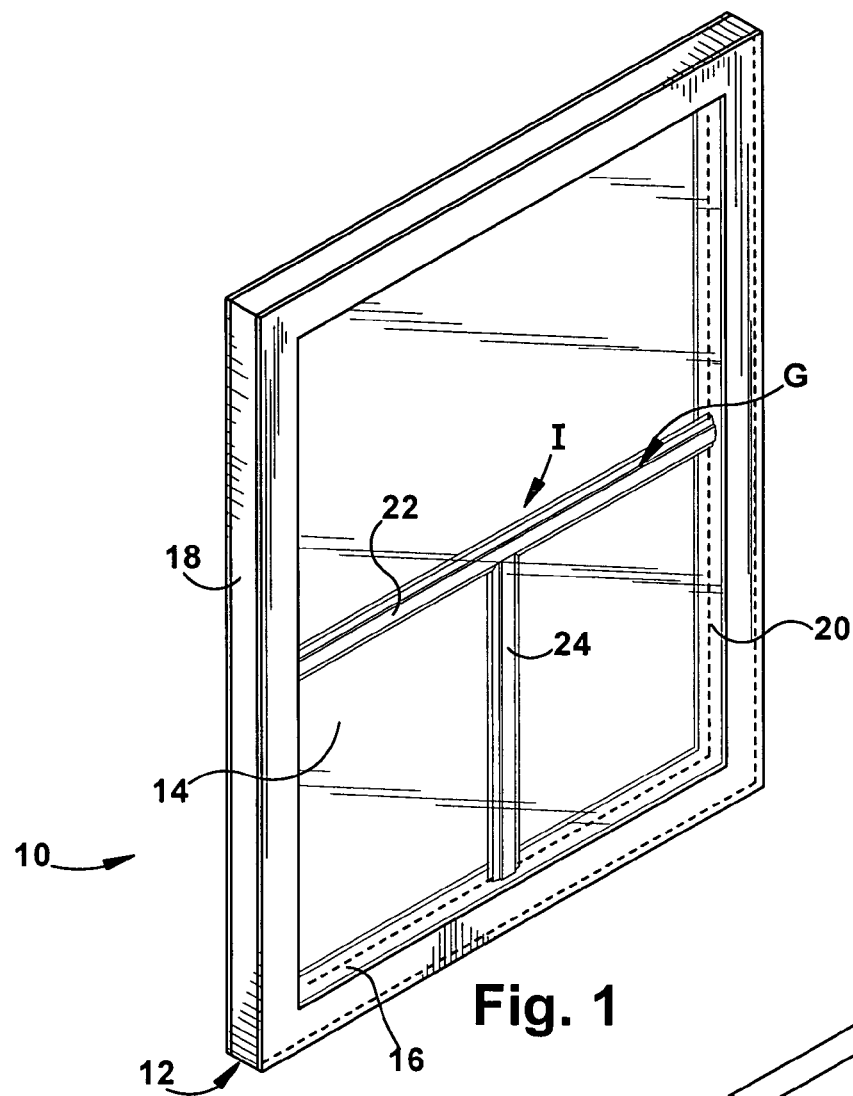
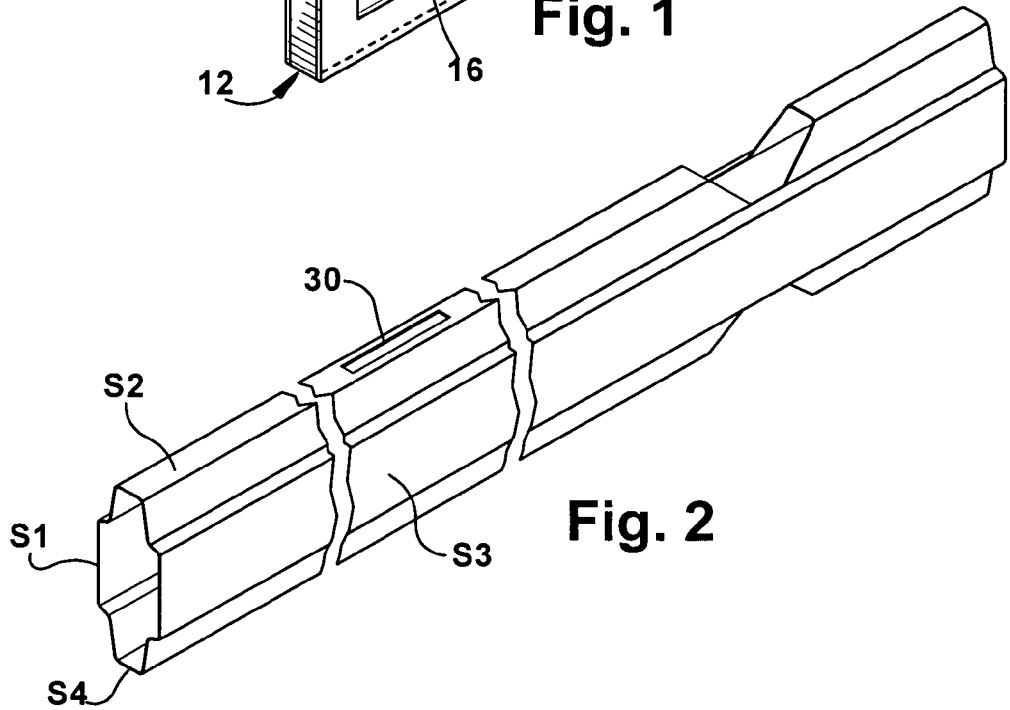

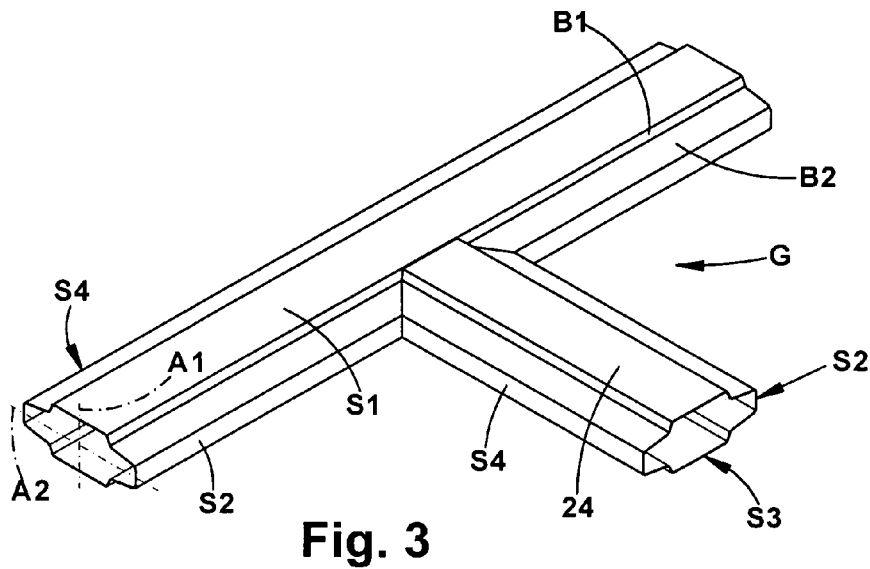
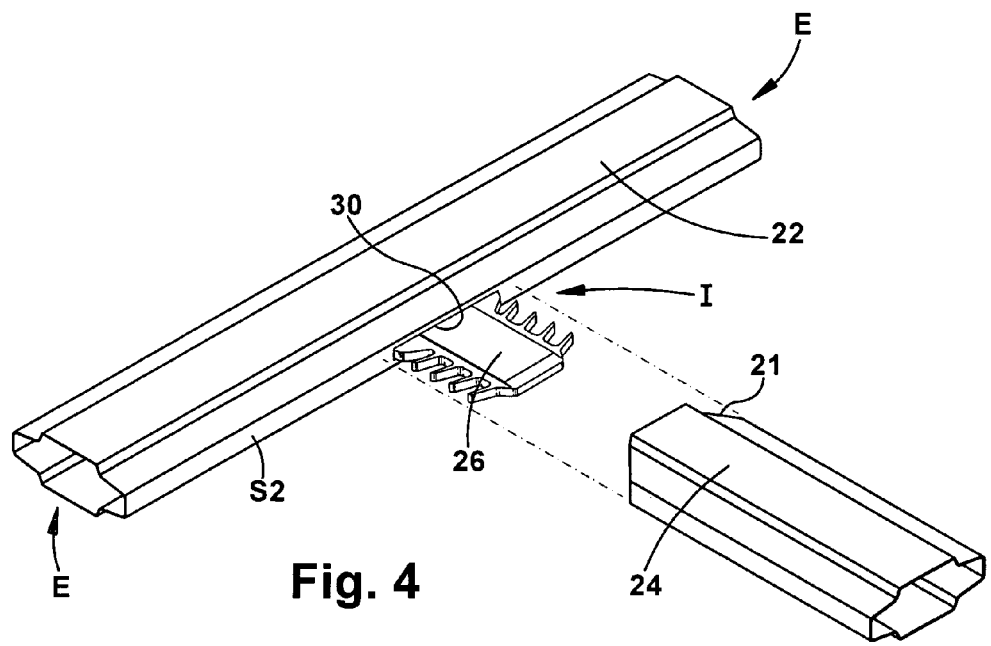

MUNTIN BAR CLIP AND MUNTIN BAR ASSEMBLY

FIELD OF THE INVENTION

The present invention relates to muntin bar clips for use in interconnecting muntin bars to form a muntin bar grid used to simulate a multi-pane window or door.

BACKGROUND ART

Windows constructed from multiple glass panes utilized "muntins" or "muntin bars" to secure the edges of the individual glass panes within the window sash. In many windows, muntins formed distinctive grid patterns that are associated with architectural styles of buildings containing the windows.

Modern windows formed by insulating glass units utilize single glass lites separated by an insulating air space. Where a particular architectural "look" is desired, a grid of muntin bars is fixed in the air space between the glass lites to simulate a multipane window. Typical muntin bars for insulating glass units are formed from decoratively coated interfitted metal tubes. The grids are anchored to the insulating glass unit periphery.

Muntin bar stock is produced by roll forming decoratively coated sheet material such as aluminum or steel, in a known manner. Various sizes of the sheet material are used to form different size muntin bar stock. The roll forming machine has a series of rolls configured to form sheet material into elongated tubular muntin bar stock. A window manufacturer purchases the muntin bar stock size(s) needed to produce insulating glass units, cuts the stock into lengths that are notched and assembled into grids for incorporation into the insulating glass units.

The cut-to-length muntin bars are then fed to a notching device to form notches that will be located at the muntin bar intersections. Although some machinery may be specialized to notch the bars for forming grids, the muntin bars typically must be manually handled to produce correctly sized muntin bars with properly located notches.

U.S. Pat. No. 6,173,484 to McGlinchy et al discloses a system for fabricating muntin bars from sheet material. Sheet material in the form of thin ribbon stock is fed to a first forming station including a punching mechanism that punches the ribbon stock at a precisely predetermined location. The ribbon stock is delivered from the first forming station to a second forming station in the form of a rolling mill. The stock passes through a succession of forming rolls to produce a tube having a desired cross-sectional shape. The tube is delivered from the second forming station to a third forming station including a severing apparatus that severs the tube at a precisely predetermined location to produce a muntin bar. After severing, the muntin bar is engaged by a conveyor and moved to a desired location.

U.S. Pat. No. 6,651,304 to McGlinchy et al discloses a method and apparatus for making a contoured muntin bar. A supply of sheet material having a finished surface on at least one side in the form of a coiled ribbon is unwound and fed along a strip path of travel to a punch station. At the punch station a ribbon punching mechanism punches the ribbon at a precisely predetermined locations along the ribbon to form one of a plurality notch patterns that define a portion of a contoured muntin bar. Downstream along the travel path from the punch station the ribbon is fed through a forming station having a succession of forming rolls that define a succession of forming roll nips to bend the ribbon and form a generally closed cross-sectional tube. The rolls form a number of bending stages to produce a muntin bar tube having a contoured shape with raised sides to provide an attractive appearance to a muntin grid.

U.S. Pat. No. 5,099,626 to Seeger concerns a connecting connector for connecting hollow muntin bars transversely to each other and includes barbed projections or hooks which engage openings in plan sides of a tubular muntin bar.

U.S. Pat. No. 6,244,012 concerns a muntin bar joiner for connecting muntin bars in a grid. The muntin bar comprises a relatively flat, thin body, a first muntin bar engagement leg extending from one end of the body, a second muntin bar engagement leg extending from an opposite end of the body, and first and second abutments extending from the body. The muntin bar engagement legs extend along a longitudinal axis of the joiner and the first and second abutments extend from the body transverse to the axis. Each abutment comprises a muntin bar abutment face oriented in a direction transverse to the axis, with the abutment faces facing in opposite axial directions. The disclosed joiner has opposite body sides that define substantially parallel major surfaces and opposite edges that are substantially parallel and extend substantially parallel to the axis. Different embodiments are disclosed in which the abutments extend from body sides or body edges. The disclosure of the '012 is incorporated herein by reference.

SUMMARY

The present disclosure concerns method and apparatus for interconnecting individual muntin bars that make up a muntin bar grid by use of a muntin joiner clip.

A tubular muntin bar grid constructed in accordance with an exemplary embodiment has a first muntin bar formed from an elongated tube having ends that engage a window spacer frame and include side walls that have relatively narrow top and bottom planar walls and relatively wider side planar walls. The top and bottom planar walls defining one or more slots that define intersecting muntin bar positions. One or more intersecting muntin bars formed from elongated tubes have ends that engages the first elongated muntin bar in a region of a slot.

The grid includes one or more joiner clips for positioning the one or more intersecting muntin bars in relation to said first muntin bar. Each joiner clip has a tree portion that extends into one end of said intersecting muntin bars to support the intersecting muntin bars in relation to the first muntin bar and an anchor portion which extends into a slot of said first muntin bar and connects to a wall of the first muntin bar spaced from a wall of the first muntin bar contacted by an associated intersecting muntin bar which engages the tree portion of the joiner clip.

These and other features of the muntin bar grid system will become better understood from the detailed description of a preferred embodiment of the invention which is described in greater detail in conjunction with the accompanying drawings.

BRIEF DESCRIPTION OF THE DRAWINGS

FIG. 1 is a perspective view of an insulating glass unit including a muntin bar grid constructed in accordance with the invention;

FIG. 2 is an enlarged perspective view of an elongated tube of metal before it is cut into individual muntin vars that make up the muntin bar grid of the insulating glass unit of FIG. 1;

FIG. 3 is an enlarged perspective view of an intersecting portion of two contour muntin bars;

FIG. 4 is an enlarged perspective view of the intersecting portion shown in FIG. 3 with one bar disengaged from a transversely extending bar to show an interconnecting clip;

DETAILED DESCRIPTION OF PREFERRED EMBODIMENTS

Figure 5:
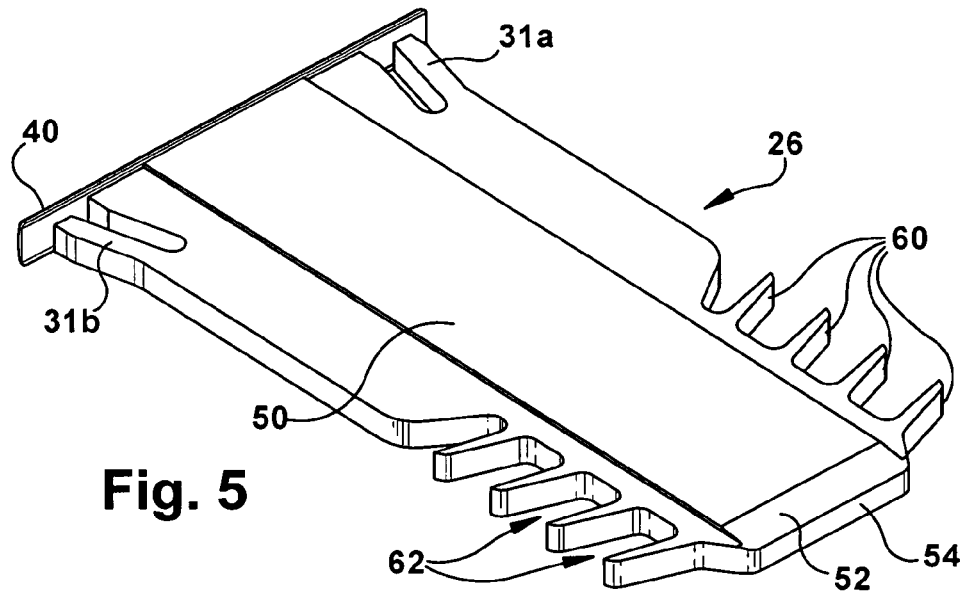
FIG. 5 is a perspective view of a muntin bar joiner clip.
Figure 6:
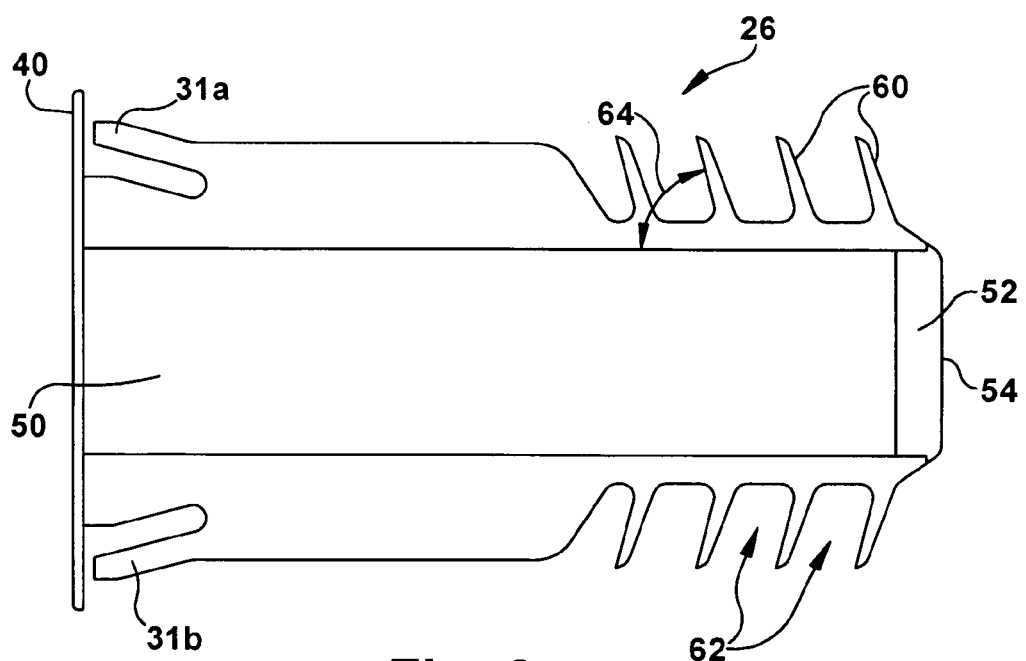
FIG. 6 is a plan view of the muntin bar joiner clip of FIG. 5.
Figure 7A:
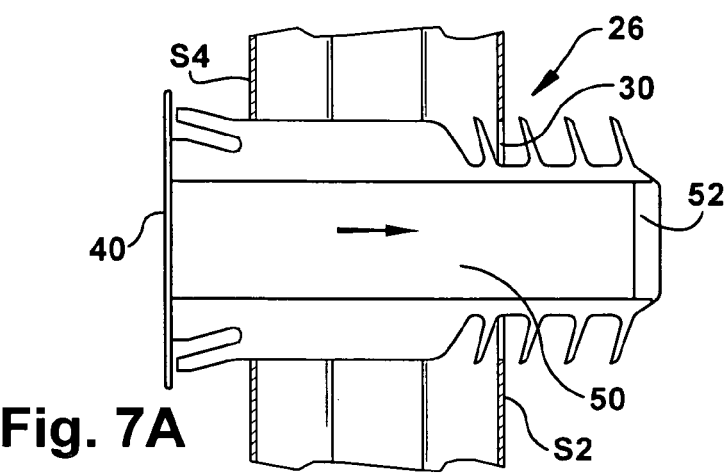
FIGS. 7A-7C schematically illustrate mounting of the joiner clip to a muntin bar.
Figure 7B:
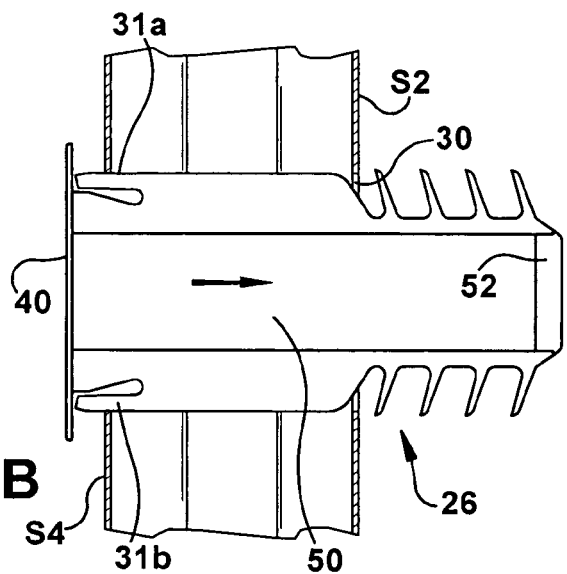
Figure 7C:
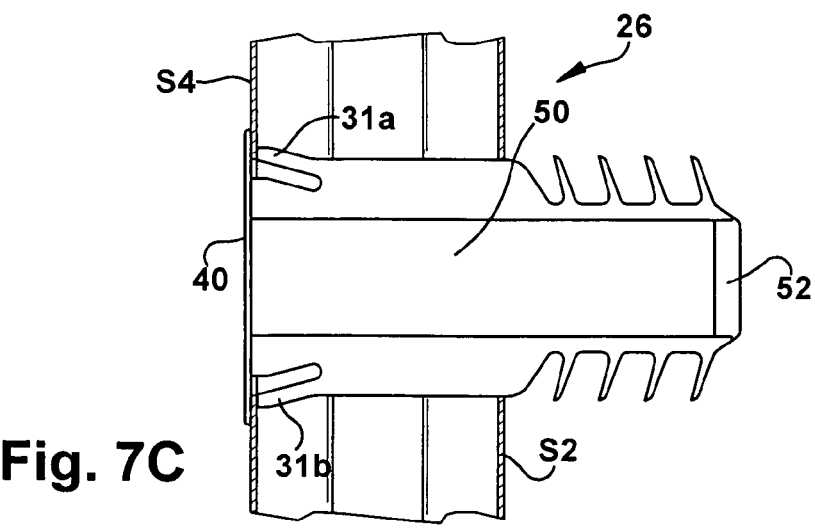

FIG. 1 shows an insulating glass unit indicated generally by the reference numeral 10 comprising a spacer assembly 12 sandwiched between glass sheets, or lites, 14. The spacer assembly 12 includes a frame assembly 16 hermetically joined to the glass lites by a sealant 18 to form a closed dead air space 20 between the lites. The unit 10 is illustrated in FIG. 1 in condition for assembly into a window or door frame (not shown).

A muntin bar grid G is disposed between the glass lites to provide the unit 10 with the appearance of a multi-pane window. Depending on the size of the glass sheet mounted in the spacer assembly the grid G can subdivide the glass sheet into different number of segments or panes. The lite illustrated in FIG. 1 has been divided into three different panes, but many other configurations of muntin bar grids for dividing the lights into other numbers of panes is possible.

The muntin bars depicted in FIGS. 1, 2, 3 and 4 are contoured muntin bars. Such a muntin bar presents an appealing appearance and is disclosed in more detail in U.S. Pat. No. 6,651,304 B2 which is incorporated herein by reference. Different grid configurations are also depicted in the '304 patent.

As seen in the views of FIGS. 2 and 3 an interior region of the bars is hollow and the sheet material used to construct the muntin bar is bent to be symmetric on opposed sides of transverse axes A1, A2 that intersect four generally flat surfaces S1, S2, S3, S4. Beveled portions B1, B2 span a region between the generally flat surfaces. FIG. 2 illustrates an elongated tube of material that has been bent from a flat strip prior to severing individual muntin bars from the strip. Notches have been formed however to define a mitred end 21 of one bar and an elongated generally rectangular slot 30 formed in one wall S2.

FIG. 1 illustrates a grid G for dividing the light into three panes. Other grid configurations such as in the '304 patent would have more panes. As seen in FIG. 1 a first elongated muntin bar 22 extends across a width of the window. Attached to an intersecting region I of the bar 22 is a shorter transversely extending bar 24. The shorter bar 24 is connected to the elongated muntin bar 22 by means of a muntin clip 26 (preferably constructed from plastic) that extends into a middle region of the bar 22. When the clip is attached to the muntin bar 22, it extends beyond the one side of the bar 22 so that the transverse muntin bar 24 can be attached to the clip 26.

During fabrication of the grid G from its constituent muntin bars 22, 24 one end of the clip 26 is inserted into one of two elongated side slots 30 in the bar 22 and is pushed through the elongated bar 22 so that the end of the clip first inserted into the bar 22 exits a similar slot 30 formed in an opposite side surface S2 of the bar 22.

For the clip to extend into and be securely mounted the clip 26 has two flexible fingers 31a, 31b that flex inwardly so that the clip 26 can be pushed through the muntin bar 22. When the clip has been pushed through the bar the fingers snap back to its unflexed position and trap the clip in place between the fingers and an abutting tab 40 which overlies the surface S2 to prevent the clip from being withdrawn and also cosmetically covers the slot 30 in the muntin bar opposite the flexible fingers. The clip 26 can be molded to the match the decorative color of the stock material S. The clip can also be fabricated from two pieces, so that the abutting tab 40 can be made to match the decorative color of the stock material S and the flexible finger portion of the clip 26 can remain unchanged and used in different applications with different muntin bar styles and sizes. Another alternative is to have an over-cap 110 (FIGS. 8 and 9) that is decorated to match the exterior stock material color that would cover the abutting tab 40. These variations are all designed to visually minimize the exposed portion of the clip's appearance at the intersecting joint. The tab 40 is spaced from a tip of the two fingers 31a, 31b a sufficient distance so that the muntin bar side wall S4 fits into the region between fingers and tab.

Flat ends E of the muntin bars that make up the grid G are secured to the interior of the spacer frame assembly 16 by suitable fasteners as are known in the art. Opposite ends of the muntin bar 22 are cut by a saw to present a planar end that uniformly abuts a generally flat surface of the spacer frame assembly 16. While both ends of the bar 22 are uniformly cut to define generally planar abutting ends, the shorter transverse muntin bars 24 has one flat end for abutting a spacer frame and an inwardly facing mitred end 21 that overlies the intersecting region I of the bar 22 in the region of the slot 30.

FIG. 2 shows a length of stock material S that is to be formed into a muntin bars. One side of the stock material S may be coated or otherwise treated to include a decorative color or pattern. The stock material S is in the form of thin ribbon stock material and may comprise, for example, aluminum or steel.

Ribbon stock material is fed lengthwise through a muntin bar production line including a series of forming stations and is formed into a muntin bar such as those depicted in FIGS. 2, 3 and 4. A first forming station forms one of a number of different notch patterns at precise locations along the length of the stock material S. The choice of the particular notch pattern depends on the type of muntin bar being formed. Downstream from the first forming station, a second forming station bends the notched sheet material into a tubular muntin bar. The finished configuration of the illustrated tubular muntin bar comprises a tubular member closed about its periphery. A third forming station severs the tubular muntin bar at a desired predetermined location. To form properly finished mitred ends on muntin bars that engage the sides of other muntin bars, the third forming station also finishes the mitred end (or ends) of the bar so that the bar can overlap the side portion of a transversely extending bar such as the muntin bar 22.

Additional detail of the muntin bar fabrication process are described in more detail in U.S. Pat. No. 6,173,484 to McGlinchy et al which is incorporated herein by reference. As described in this patent, A scheduler/motion controller unit is preprogrammed to co-ordinate and to control the various stations of the production line in order to govern muntin bar size, the stock feeding speeds in the line, activation of the forming stations, and other parameters involved in production. Most preferably the controller unit includes a programmable controller having a central processing unit that presents a user interface to allow the forming steps performed by the production line to be changed during set up of the line.

The production line that operates under control of the controller unit produces sequences of muntin bars that make up a grid. The grid G of FIG. 1 is a simple example of one such grid. This grid is made up of two different muntin bars 22, 24 having different lengths and different end configurations which are used in a particular window size. When a different size window and hence different length and width spacer frame is needed, the user need merely enter dimensions of the frame into the controller unit and indicate the number of panes that the grid needs to define and the newly specified grid is produced by the production line. The last muntin bar of the previous grid G and the first muntin bar of the newly specified grid can be produced one after the other without inconvenience of extended machine setup or production of scrap produce between jobs.

The preferred clip has a center spine 50 of uniform thickness that tapers along a tapered region 52 to form a flat end 54. Extending from the center spine 50 are elongated fingers 60 that are spaced apart by gaps 62. The fingers form an angle 64 with respect to the spine and flex slightly as the spine is inserted into a mitred region of a muntin bar.

One noteworthy feature of the retaining tabs 31a and 31b is that it facilitates a tight clip fit regardless of the overall bar thickness (distance between surface S2 and S4 of the finished bar 22. These thicknesses generally have a tolerance that could cause the clip 26 and mating bar 24 to fit loosely if the clip were retained on the far side of the abutting tab 40.

Figure 8:
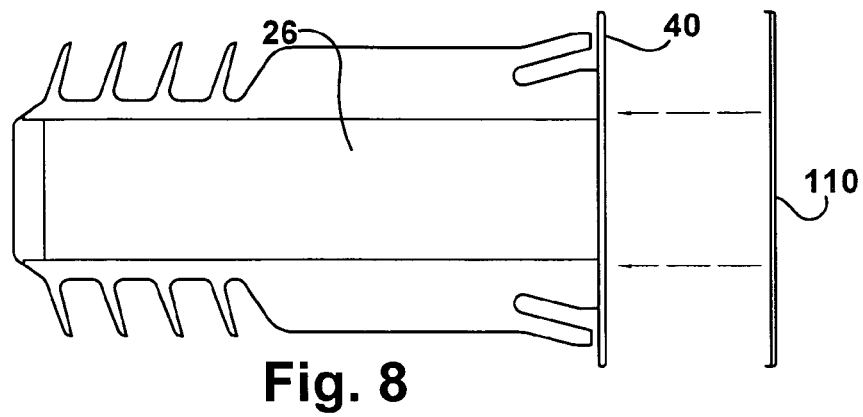
FIGS. 8-10 depict elevation views of an alternate embodiment of a clip having an end cap that matches a color of the muntin bar to which it is attached.
Figure 9:
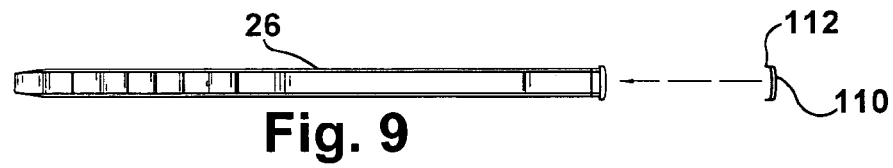

Turning to FIGS. 8 and 9, in this embodiment, the tab 40 is covered with an end cap 110. In the embodiment of FIG. 8 the end cap frictionally engages the top (exposed) surface and has flexible hooks at either end which flex slightly as they fit over the tab and then grip the tab. As seen in FIG. 9, the tab 40 has a width that is slightly wider than the thickness of the clip's spine 50. In this embodiment an elongated flexible lip 112 extends along the length of the end cap 110. The lip flexes outwardwardly and then snaps back to overlie the elongated side edges of the tab 40 to firmly maintain the end cap in place.

Figure 10:
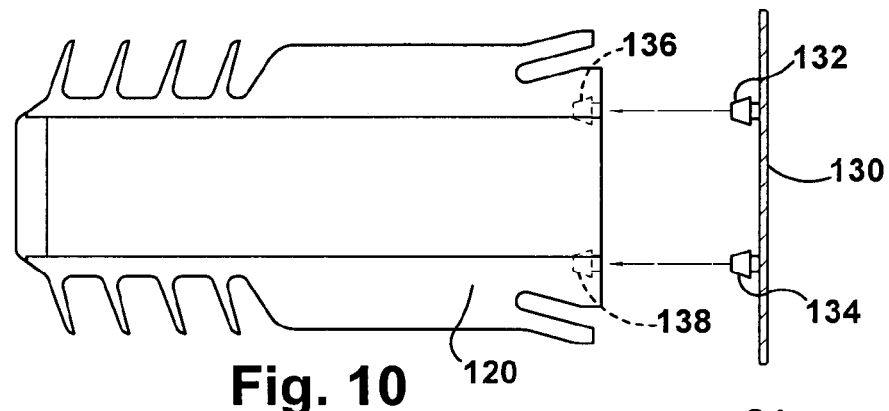

In FIG. 10 the clip 26 has a base portion 120 that has the fingers 31a, 31b but is molded without the tab 40 for engaging the wall S4 of the muntin bar 22. A separate end cap 130 includes two flexible studs 132, 134 that are pushed into corresponding holes 136, 138 in the end of the clip 26 spaced from the bar retaining fingers 60. The studs are compressed slightly as they enter a narrow region of the holes and then widen upon reaching a wider well portion of the holes 136, 138. This retains the end cap in place and prevents removal of the clip from the bar 22.

Figure 11:
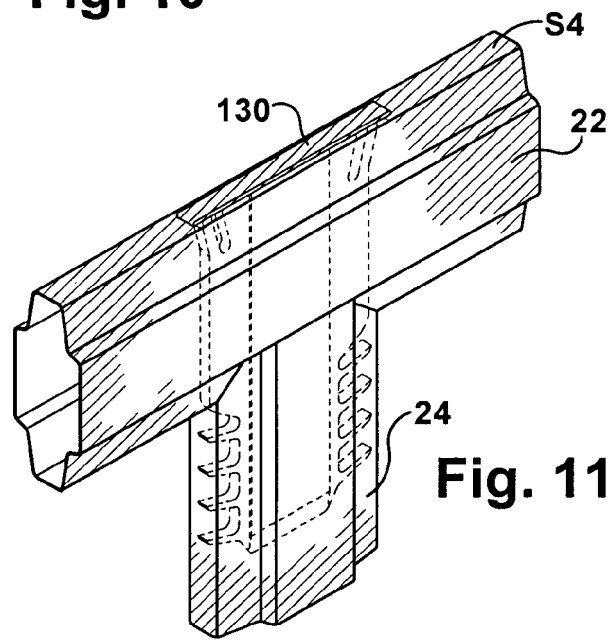
FIG. 11 is a perspective view of the alternate embodiment shown in FIGS. 8-10 attached to a muntin bar.

The depiction of FIG. 11 illustrates the combination of the two bars 22, 24 with the end cap 130 retaining the clip in place. The bars and end cap are cross hatched to depict the color brown and show that the appearance of the end cap and/or tab 40 can be made to match the color of the muntin bars to which it is attached. This aspect of the invention also allows different color end caps to be used with a universal style clip 26 (meaning that fins 60 and locking tabs 40 have sufficient compliance to be used with multiple size muntin bars having different size slots 30) since the clip is hidden from view once the cap is attached to the clip and the fingers 31a, 31b secured to the wall of the muntin bar 22.

While the invention has been described in detail with respect to the preferred embodiments thereof, those skilled in the art will appreciate that many changes and modifications may be made thereto without departing from the spirit scope of the invention as defined in the claims.

What is claimed:

1. A tubular muntin bar assembly comprising:
  a) a first muntin bar formed from an elongated tube having ends that engage a window spacer frame and include side walls that have relatively narrow top and bottom planar walls and relatively wider side planar walls, said top and bottom planar walls defining one or more slots that define positions for intersecting muntin bars;
  b) one or more intersecting muntin bars formed from elongated tubes having one end that engages the first elongated muntin bar in a region of a slot;
  c) one or more joiner clips for positioning the one or more intersecting muntin bars in relation to said first muntin bar comprising:
    i) a tree portion that extends into one end of said intersecting muntin bars to support the intersecting muntin bars in relation to the first muntin bar;
    ii) an anchor portion including a flexible body which flexes to a configuration which allows said flexible body to extend through a first slot of said first muntin bar as the tree portion extends through a second slot of the first muntin bar in a wall of the first muntin bar contacted b an associated intersecting muntin bar which engages the tree portion; and
    iii) a tab laving an abutting portion that seats against an outer wall the first muntin bar at the region of the first slot to fix in position the joiner clip with respect to the first muntin bar and further having a generally planar, outwardly facing cover having a surface area greater than an area of the first slot which overlaps edges around a perimeter of the first slot.

2. The muntin bar assembly of claim 1 wherein the first and intersecting muntin bars are contoured muntin bars and the end of the intersecting bar that contacts said first muntin bar is mitred.

3. The muntin bar assembly of claim 1 wherein ends of the first muntin bar are generally flat to engage sides of the spacer frame.

4. A method for joining two intersecting muntin bars comprising:
  providing a first tubular elongated muntin bar having two aligned slots of the same general width that extend through opposed walls of said first tubular elongated muntin bar;
  providing an intersecting muntin bar having a mitred end;
  attaching a joiner clip having an end tab with a slot covering surface at one end of the joiner clip that is greater in area that an area of a slot in to the first elongated muntin bar by:
    i) inserting a center portion of the joiner clip having an outwardly extending bar support through the opposed slots of the first muntin bar; and
    ii) spacing a flexible finger of said joiner clip with respect to the end tab so that the finger flexes inwardly as said finger passes through one of said slots and expands outwardly to trap wad of the tubular elongated muntin bar in the region of a first slot between an end of the finger and the tab that covers a perimeter of the first slot to attach the joiner clip to the first tubular elongated muntin bar with the bar support extending beyond said first elongated muntin bar; and
  after attaching the joiner clip to the elongated muntin bar, attaching the intersecting muntin bar to the joiner clip by fitting the mitred end of the intersecting muntin bar onto the outwardly extending bar support.

5. A tubular muntin bar assembly comprising:
a) a first muntin bar formed from an elongated tube having ends that engage a window spacer frame and include side walls that have relatively narrow top and bottom planar walls and relatively wider side planar walls, said top and bottom planar walls slots that define positions for intersecting muntin bars;
b) an intersecting muntin bar formed from elongated tubes having one end that engages the first elongated muntin bar in a region of a slot;
c) a joiner clip for positioning the one or more intersecting muntin bars in relation to said first muntin bar comprising:
   i) a tree portion that extends into one end of said intersecting muntin bars to support the intersecting muntin bars in relation to the first muntin bar; ii) an anchor portion including a body which passes through a first slot of said first muntin bar as the tree portion extends through a second slot in a wall of the first muntin bar contacted by an associated intersecting muntin bar which is supported by the tree portion; and iii) a tab that forms one end of the joiner clip having an abutting portion having a exposed surface area greater than an area of the first slot that seats against an outer wall of the first muntin bar around a perimeter of the first slot to attach the joiner clip to the first muntin bar and further having a generally planar, outwardly facing cover surface which overlaps edges of the first slot.

* * * * *